United States Patent
Greene et al.

(10) Patent No.: US 12,554,857 B2
(45) Date of Patent: Feb. 17, 2026

(54) SOFTWARE SECURITY ANALYSIS

(71) Applicant: Apilyze, Inc., The Hills, TX (US)

(72) Inventors: James Greene, Mesa, AZ (US);
Anirban Banerjee, The Hills, TX (US)

(73) Assignee: Apilyze, Inc., The Hills, TX (US)

( * ) Notice: Subject to any disclaimer, the term of this patent is extended or adjusted under 35 U.S.C. 154(b) by 521 days.

(21) Appl. No.: 18/153,235

(22) Filed: Jan. 11, 2023

(65) Prior Publication Data
US 2023/0222225 A1 Jul. 13, 2023

Related U.S. Application Data

(60) Provisional application No. 63/326,402, filed on Apr. 1, 2022, provisional application No. 63/314,069, filed on Feb. 25, 2022, provisional application No. 63/298,416, filed on Jan. 11, 2022.

(51) Int. Cl.
*G06F 21/57* (2013.01)
*H04L 9/40* (2022.01)

(52) U.S. Cl.
CPC ........ *G06F 21/577* (2013.01); *H04L 63/1416* (2013.01); *H04L 63/1425* (2013.01); *G06F 2221/033* (2013.01)

(58) Field of Classification Search
CPC ............. G06F 21/577; G06F 2221/033; H04L 63/1433; H04L 63/1425; H04L 63/1416
See application file for complete search history.

(56) References Cited

U.S. PATENT DOCUMENTS

| | | | | |
|---|---|---|---|---|
| 8,397,057 B2* | 3/2013 | Halbedel | ............... | H04L 67/564 713/154 |
| 2015/0229671 A1* | 8/2015 | Boss | ....................... | H04L 69/40 726/26 |
| 2019/0079734 A1* | 3/2019 | Kadam | .................. | G06F 21/577 |
| 2019/0245879 A1* | 8/2019 | Ward | .................. | H04L 63/0236 |
| 2022/0159028 A1* | 5/2022 | Kumar | ................ | H04L 63/1433 |

* cited by examiner

*Primary Examiner* — Thaddeus J Plecha

(57) ABSTRACT

Systems and methods are disclosed for software security analysis. In certain embodiments, a method may comprise identifying a set of potential security vulnerabilities, comparing the potential vulnerabilities to a catalog identifying elements on a client system, and generating risk mitigation advice based on potential security vulnerabilities matching an element in the catalog. The method may include evaluating a data field of a service request to a third party to determine an expected data type for the field, determining whether the actual data included in the service request matches the expected data type, and quarantining the service request when the actual data does not match the expected data type. The method may comprise operating as a proxy for the service request, including receiving the service request from the client system, evaluating the service request for irregularities, and forwarding the service request to the third party once the irregularities have been addressed.

20 Claims, 3 Drawing Sheets

SOFTWARE SECURITY ANALYSIS

CROSS-REFERENCE TO RELATED APPLICATION

The present application claims priority to U.S. provisional patent application, Application No. 63/326,402, filed Apr. 1, 2022, entitled "SOFTWARE SECURITY ANALYSIS"; to U.S. provisional patent application, Application No. 63/314,069, filed Feb. 25, 2022, entitled "SOFTWARE SECURITY DISCOVERY"; and to U.S. provisional patent application, Application No. 63/298,416, filed Jan. 11, 2022, entitled "SOFTWARE SECURITY EVALUATION", the contents of which are hereby incorporated by reference in their entirety

SUMMARY

In certain embodiments, a method may comprise executing a security analysis operation for a client computing system, including evaluating a data field of a service request from the client computing system to a third party to determine an expected data type for the data field, determining whether the actual data included in the service request corresponds to the expected data type, and quarantining the service request when the actual data does not correspond to the expected data type.

In certain embodiments, a system may comprise a processor configured to execute a security analysis operation for a client computing system, including identify a set of potential security vulnerabilities, compare the set of potential security vulnerabilities to a catalog identifying elements on the client computing system, and generate risk mitigation advice based on potential security vulnerabilities matching an element in the catalog.

In certain embodiments, a memory device may store instructions that, when executed, cause a processor to perform a method comprising executing a security analysis operation for a client computing system, including operating as a proxy for a service request between the client computing system and a third party. Operating as a proxy may include receiving the service request from the client computing system, evaluating the service request for irregularities, and forwarding the service request to the third party once the irregularities have been addressed.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
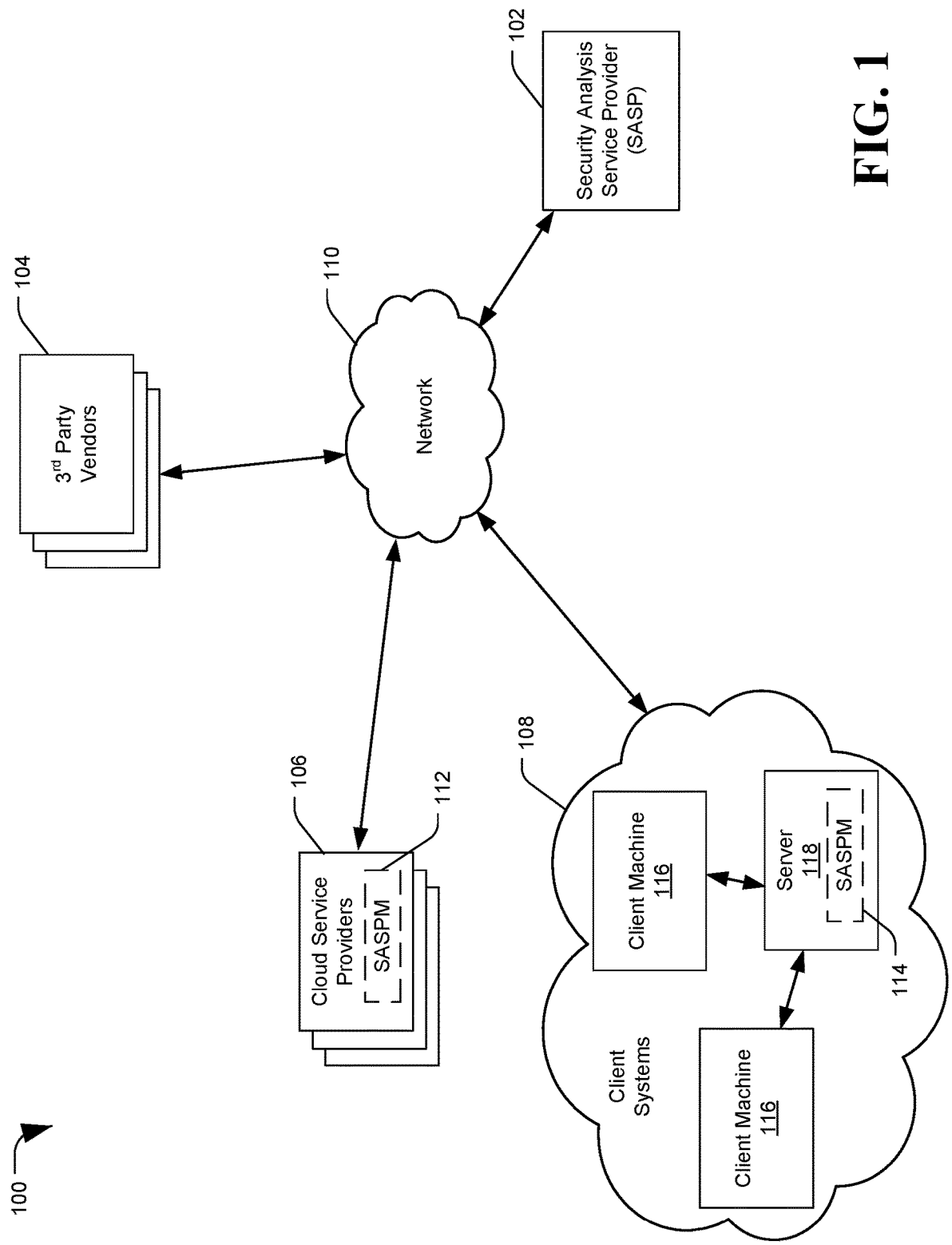
FIG. 1 is a diagram of a system configured for software security analysis, in accordance with certain embodiments of the present disclosure.

FIG. 1 depicts a diagram of a system 100 configured for software security analysis, in accordance with certain embodiments of the present disclosure. The system may include a security analysis service provider (SASP) 102, one or more third party software or service vendors 104, one or more cloud service providers 106, one or more client systems 108, and a network 110 over which the components may communicate and exchange data. Each or any of SASP 102, third party vendors 104, cloud service providers 106, and client systems 108 may be implemented via computers, servers, hardware and software modules, or other system components. Software developed or distributed by the third party vendors 104 may be stored or executed at cloud service providers 106 or client systems 108 as part of the software code base for a client's business operations.

Businesses may rely on complex technology ecosystems to operate their business transactions and manage data. These ecosystems may include a digital supply chain involving multiple client computers and servers 116 and 118 (generally, "client machines"), third party software from third party vendors 104, cloud hosting services 106, and data traffic across one or more networks 110 for communication between these components. For example, client systems 108 may include a collection of networked or stand-alone computers and servers 116, 118 operating as user workstations or backend servers running the business' production code for websites, CRM (customer relationship management), etc. Cloud service providers 106 may host software or data for the client business, including hosting websites or databases of records. The third party vendors 104 may provide software for installation or execution at other components (e.g., at cloud hosting systems 106 or client systems 108), may provide cloud-based software-as-a-service (SaaS), and may receive data from, e.g., client systems 108 or cloud service providers 106 for storage or processing. The data that is exchanged between any of the components of system 100 may be proprietary information, personally identifiable information (PII), financial transactions, or any number of other forms of data that may be valuable, sensitive, or subject to industry or legal regulations and requirements, such as HIPAA (Health Insurance Portability and Accountability Act), GDPR (General Data Protection Regulation), CPRA (California Privacy Rights Act) and CCPA (California Consumer Privacy Act), FedRAMP (Federal Risk and Authorization Management Program), PCI (Payment Card Industry) standards, or other data protection regulations.

Due to the complexity of the business technology environment of system 100, it can be difficult for a business to ensure that the components and data traffic are secure and comply with regulatory requirements, and that data is only going to the proper external entities. The system 100 may include numerous software elements using source code and libraries that may be out-of-date or contain vulnerabilities. Due to the often transparent workings of software and components of the technology environment, a business may be providing information to external parties in an unsecured manner, transmitting data that should not be provided to external parties, or providing data to parties that the business does not expect or know about, without even being aware of it. Performing a manual audit of a business ecosystem or supply chain may be extremely difficult, time-consuming, and prone to errors, and infeasible to perform on a constant basis.

Accordingly, a security analysis service provider 102 may implement systems and methods to catalog a business' software ecosystem, monitor data traffic, identify vulnerabilities and security risks, and to generate advice regarding remedial actions based on the overall system analysis. The SASP 102 can produce a comprehensive system catalog of all software components of a client's digital supply chain or software ecosystem, their vulnerabilities, and their interactions. For example, an enterprise business 108 may transfer sensitive customer information to third party vendors 104 for analytics, security, logging, alerting, storage, etc., in a manner that can cause violations of GDPR and CCPA compliance. The SASP 102 can provide digital supply chain management, security, and auditing to identify the sources and causes of such compliance violations and unsafe data practices, enabling the business 108 to update or replace the non-compliant components.

The SASP 102 can identify, secure, and audit the software building blocks of a company's web services. The SASP 102 can identify what pieces are third party, and can catalog every interaction between a business and its vendors. Based on scanning and monitoring the software and communications of a business, the SASP 102 can provide a real-time data flow diagram, as well as generating a catalog of components and their interactions, sometimes referred to as a software bill of materials (SBOM). The SASP 102 can ensure a privacy-focused chain of custody for customer information, and prevent unintentional compliance violation of GDPR, CCPA, FedRAMP, PCI, or other standards and regulations. The SASP 102 can risk-score each vendor based on the importance and quantity of customer data being exchanged. The software security evaluation provided by the SASP 102 may be implemented or executed without requiring agents installed on client machines used to run the business' production code, changes to DNS (domain name system) configuration, or modifications to existing CI/CD (continuous integration/continuous delivery or deployment) pipelines.

The SASP 102 may provide security evaluation via hardware or software modules, which may be referred to as SASP modules (e.g., SASPM 112 and 114). The SASPM may be implemented via servers of the SASP 102, implemented at or on cloud service servers 106 (e.g., via module 112), or implemented at or on client server 118 (e.g., via module 114), or any combination thereof. For example, a client may operate its business computing operations via servers of a cloud service provider 106. The client may provide the SASP 102 with access rights to its cloud computing systems. The SASP 102 may thereby access the cloud service provider 106 via network 110 using the access credentials, and remotely scan the software, monitor outgoing data traffic, and perform security evaluations. Alternately, software of the SASP 102 may be installed at the Cloud providers 106 (e.g., as SASPM 112) or on a computing system or server 118 within client systems 108 (e.g., as SASPM 114) to perform scanning and monitoring, and generate evaluation results locally at those systems, or provide data back to the SASP 102 via network 110 for processing and evaluation. In an example implementation, server 118 (e.g., a server computing device, or a Docker container) within client systems 108 my run a software security evaluation module 114 behind a company firewall. The SASPM 114 may be given permission to remotely access client machines 116 that run the client's production code via system-level accounts. The SASPM 114 may therefore scan and evaluate the software components installed at and running on the client machines 116 without being installed as an agent on client machines 116.

Accordingly, SASP services can be deployed in a number of ways, including: through a module 114 at client systems 108, including a downloadable plugin or a custom private deployment tailored to the client systems 108; through a deployment 112 at cloud services 106; through a software as a service (SaaS) deployment from SASP provider 102, which may be situated at multiple geographical regions, or through other means. In some examples, the SASP 102 may maintain a centralized repository of information, such as a latest code version listing for various software and OS products, a database of security vulnerabilities, and legal and regulatory compliance information, which may be used to update local installations 112, 114 at cloud service providers 106 or client systems 108. In some examples, client systems 108 may be able to access or see a real-time status of the SASP 102 code base before accepting updates, so any data breach incident can be avoided in case the SASP's code base has somehow been infected, e.g., through the use of vulnerable third-party code.

A client of SASP 102 may select which directories, files, or code repositories used by the client (e.g., at client systems 108 or cloud service providers 106) the SASP should scan, in order to evaluate a selected portion or all of the client's computing ecosystem. The client may also configure or select a scanning frequency for how often the code base should be analyzed. The client may be able to configure whether to use the SASP as a proxy, at either the local modules 112, 114 or through a remote system 102, for outbound service requests from the client's systems. The client may be able to set up multiple optional outbound proxies for third party service request calls based on the target, the software or system component from where the call is originating, the number of service request calls, the latency requirements, and more parameters.

Figure 2:
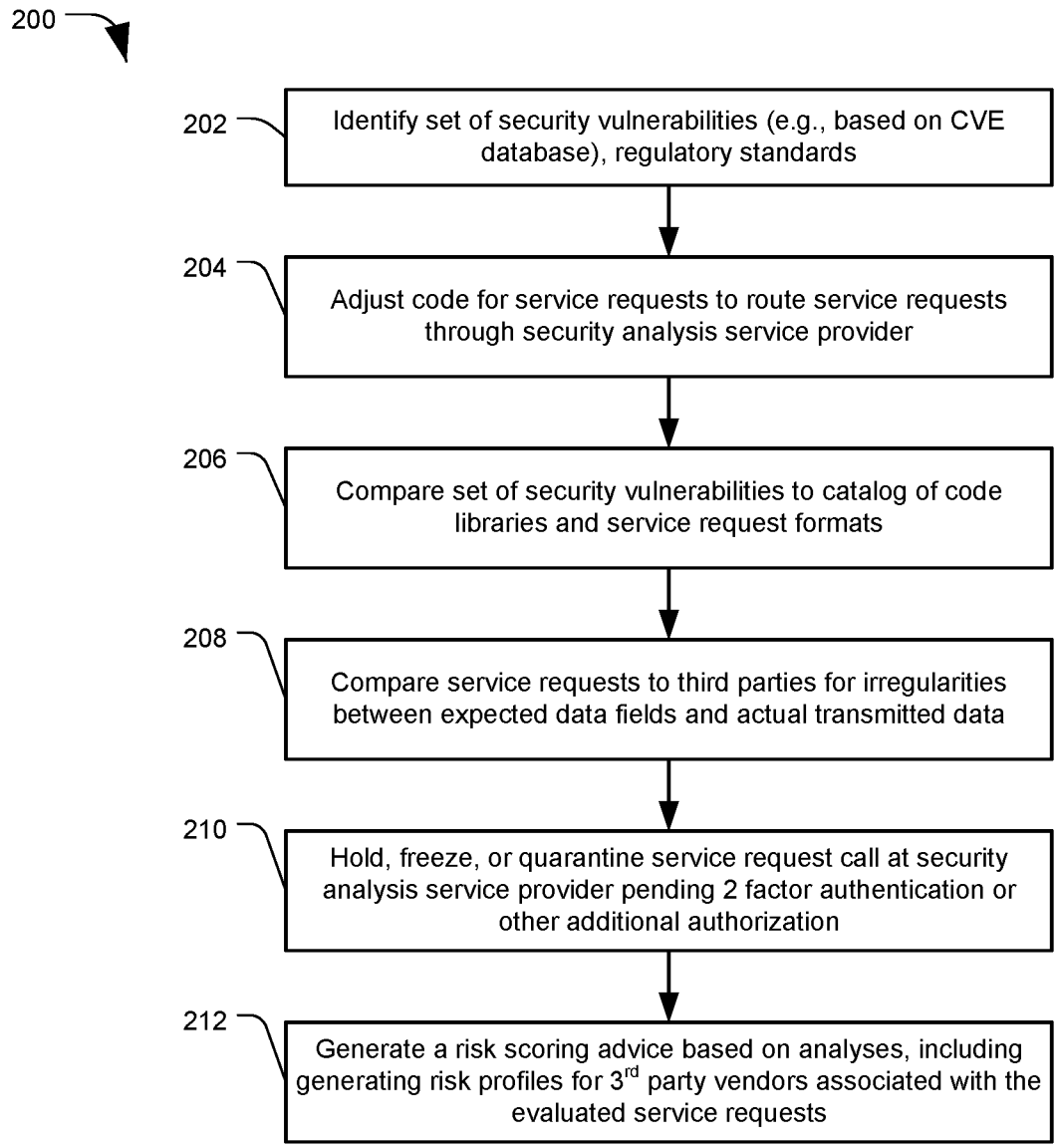
FIG. 2 depicts a flowchart of an example method for software security analysis, in accordance with certain embodiments of the present disclosure.

FIG. 2 depicts a flowchart 200 of an example method for software security analysis, in accordance with certain embodiments of the present disclosure. In particular, the method of FIG. 2 may present an example algorithm or process for performing security analysis and handling for software components identified in a catalog or software bill of materials (SBOM). An SBOM may identify the elements in a business' computer ecosystem, such as code libraries and OS (operating system) libraries and associated version indicators, service requests generated in a computing system such as third party- and internal-facing API (application program interface) calls, what data is being shared or exchanged, third party vendors for software systems, and other information. Example systems and methods for generating a SBOM are provided in U.S. Provisional Patent Application 63/314,069, filed Feb. 25, 2022, the contents of which are incorporated herein by reference. The method of FIG. 2 may be implemented by a security analysis service provider (SASP), such as SASP 102 or associated modules 112 and 114 of FIG. 1, and may be remotely executed on the file systems and programs of a separate device.

The method may include identifying one or more potential security vulnerabilities, at 202. This may include retrieving or accessing one or more databases of security vulnerabilities, such as the CVE (common vulnerabilities and exposures) database or a proprietary database of the SASP. The security vulnerabilities may include information on OS or code libraries, or specific versions of those libraries, which include known security flaws that may allow malicious actors to gain access to or control of a system employing such programs. Similarly, certain communication protocols or data formats may expose data within transmissions to unauthorized access. The security vulnerability databases may also include computer viruses, trojan programs, worms, backdoors, or similar vulnerabilities.

In addition to security vulnerabilities, the method may also include identifying various industry, legal, or regulatory standards or requirements for data privacy and handling. For example, various business or regulatory standards may require that a business employ specific communication or encryption protocols, data security policies (e.g., regarding sharing various types of customer data), or similar data management or security protocols. The legal or regulatory standards may be automatically accessed from external sources (e.g., from a regulatory authority's website), may be manually entered, or otherwise provided to the SASP.

At 204, the method may optionally include adjusting code or service request calls at the client systems to route service requests through the SASP as a proxy, prior to forwarding the calls to the final target. For example, the SASP modules 112 or 114 may be configured to intercept service requests from the client systems 108, or servers or Docker containers of cloud service providers 106, so that the service requests are quarantined by the modules 112, 114 themselves, or routed through SASP 102 over the network. The SASP 102, 112, 114 can automatically suggesting changes to the computer code so that the target of the service request call becomes the SASP. Proxied service request calls may be identified with a hash and therefore, when pointed to the SASP instead of the original target service, the SASP may recognize the hash and know where to route that specific service request call. Using the SASP as a proxy may allow the SASP to more closely monitor the content, frequency, or other aspects of the service requests. For example, service requests displaying unusual characteristics in frequency, what is being transmitted, or target may be frozen or quarantined, awaiting client approval or verification, before forwarding the message to the original target.

At 206, the method may include comparing the set of potential security vulnerabilities, regulatory requirements, or other potential problem issues, to the SBOM, or catalog of code libraries and service request formats. For example, the CVE database may identify that a certain version of a code library for a programming language includes a known security vulnerability that can expose a system to unauthorized access. The method may include checking whether any of the software in the client's ecosystem is still using the identified version of the code library. Similarly, if a regulation requires that certain PII can only be transmitted in encrypted format, the method may include checking whether any of the service requests transmit the identified PII in an unencrypted format. A user or client may be able to select or specify which regulatory standards their SBOM should be checked against.

The method may also include comparing service requests to third parties, or even internal calls, for irregularities between expected data fields and actual transmitted data, at 208. The method may include scanning and detecting if the data being passed to a service request call at runtime is the expected data. The method may include parsing the input in parallel to when the data is passed to a service request call, and regular expressions can be run on the data to highlight anything that is not expected. A regular expression, also referred to as rational expression, may be a sequence of characters that specifies a pattern in text (e.g., phone numbers or email addresses). In an example embodiment, the method may include identifying when a service request has fields for a first name and a last name, but the actual data included in the transmitted service request appears to be some other type of data, such as a number—e.g., finding an SSID (service set identifier, or the name for a Wi-Fi network) in place of a first name. The method may include identifying the expected data elements of a service request by parsing the parameter names of the service request calls in the executable code, and determining what type of data should be included from those parameter names. For example, a set of parameters to be included in a service request call may include "l.name, f.name, tel.no". The method may include evaluating these parameter names (e.g., by consulting a table matching many potential parameter names to corresponding data types) and concluding that the parameter fields should correspond to a first name, a last name, and a telephone number. If the actual data included in the service request call does not match these determined data types, the service request call may be flagged as potentially passing incorrect data. Flagged service request calls may be reviewed for accuracy by a human or other process to conclude whether the incorrect or unsafe data is being transmitted.

At 210, the method may include adjusting, freezing, or quarantining messages at the SASP if they appear to violate known security risks, contain incorrect information, exhibit unusual transmission patterns or frequencies, or otherwise appear unreliable or unsafe. For example, the SASP system may compare outgoing service request calls to a list of security issues from OWASP® API security project. Some issues may be flagged, while other issues may be corrected. For example, if the underlying service request call to a target third party vendor was made using a non-secure HTTP protocol, the SASP system may update the call to use HTTPS instead. Messages may be held pending client approval or some form of two-factor authentication to provide sufficient trust for the transmission to be completed. For example, if the SASP detects an unusual increase in the amount of service request calls to a particular third party, the SASP may hold the transmissions and generate a notification to the client business about the unusual activity. The notification may be sent via a UI of the SASP system, via an app, via text message or email, or via other mechanisms. The client may provide two-factor authentication and authorize the transmissions, at which point the SASP may forward the messages to their final destination. Alternately, the client may reject the messages, and the SASP may discard the transmissions without sending them to their target. In some examples, withholding service requests may be implemented by the SASP while operating as a proxy for messages, as described in regard to 204. In another example, the SASP system may parse through all fields in service request calls identified within a client's code, and generate a list, chart, or table of what type of data the system believes each field should be (e.g., l.name=last name). A client may then go through and update or correct incorrect assumptions. When actual service request calls are made, the SASP system may use the list to compare the data actually being passed to what is expected to be passed.

Based on the evaluation of the software components and service requests used in the client business' computer ecosystem or SBOM, the method may include generating a risk scoring report or risk mitigation advice, at 212. The method may include generating risk profiles or scores for all third party vendors or software involved in the business ecosystem. Recommendations may include identifying software to update, quarantine, or remove from the system, among other operations. In an example, risks identified in a CVE database may include risk level indicators or corrective recommendations (e.g., code_library v2.3 includes a security vulnerability—recommend updating to code_library v2.5), which recommendations may be noted for each element in the SBOM, or may be used as a factor in generating more business-specific recommendations. In some embodiments, the SBOM system may have metadata associated with the various computer ecosystem components in the SBOM identifying how those components are used by the particular business, how important they are, or how externally vulnerable they are. For example, some code elements may be external facing and accessible via the internet, while other components may be internal-facing and are less exposed to illicit access, or some components may be fundamental to business operations, while other components are of secondary importance. The SASP may be configured to use this metadata to prioritize corrective recommendations to the client business, either based on the metadata alone or in combination with risk factors and recommendations from other sources (e.g., the CVE database). Based on risk indicators and how elements are used by the business, a corrective priority list may be generated, which may identify what elements within the ecosystem should be corrected or replaced in order of importance to the business.

Figure 3:
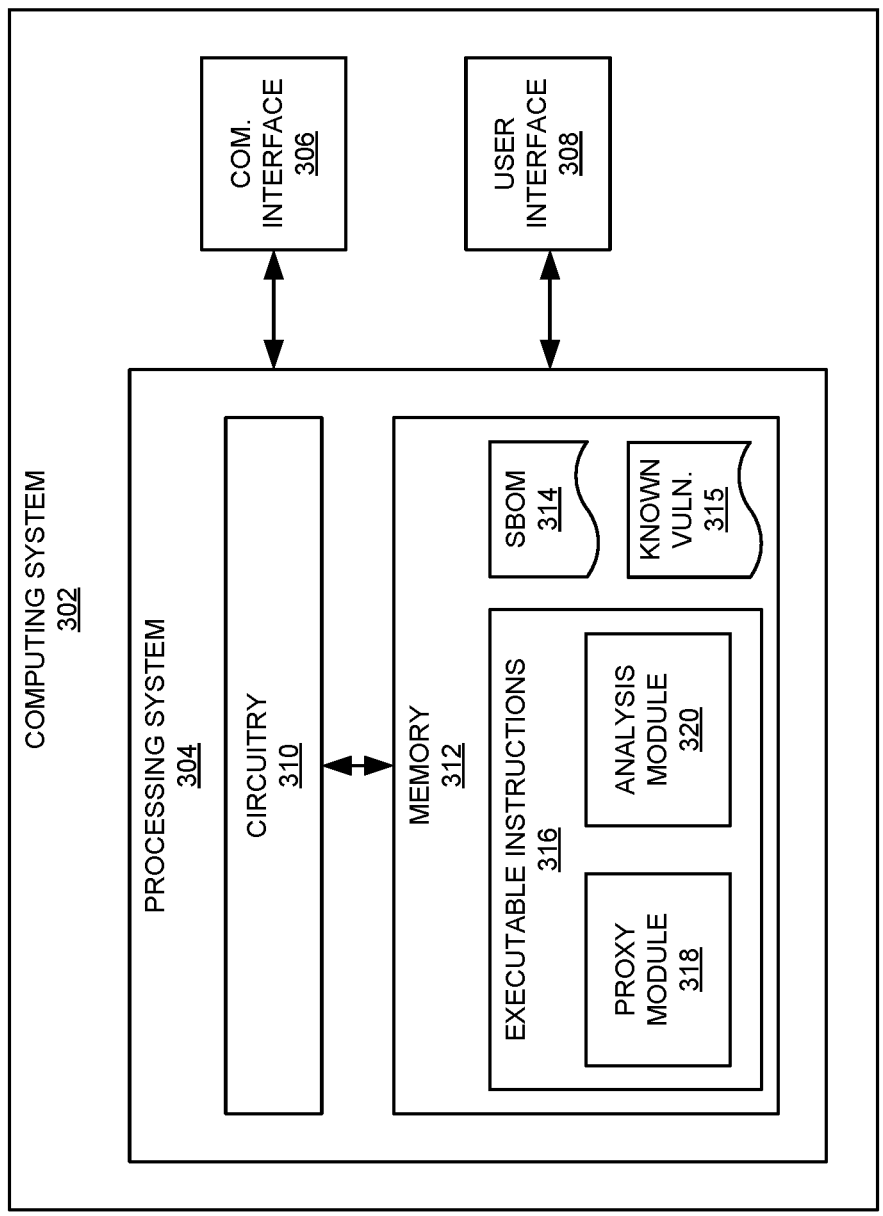
FIG. 3 is a diagram of a system configured for software security analysis, in accordance with certain embodiments of the present disclosure.

FIG. 3 depicts a diagram of a system 300 configured for software security analysis, in accordance with certain embodiments of the present disclosure. In particular, FIG. 3 depicts a computer system 302, which may be an example of any computing system that may be employed to perform the operations of client machines 116, server 118, security analysis service provider 102, cloud service providers 106, or third party vendors 104, and related processes and methods. Computing system 302 may include a processing system 304, a communication interface 306, and a user interface 308. Computing system 302 may include other components such as a battery and enclosure that are not shown for clarity. Computing system 302 may comprise one or more server computing systems, desktop computing systems, laptop computing systems, smartphone devices, or any other computing system, including combinations thereof.

Communication interface 306 may comprise components that communicate over communication links, such as network cards, ports, radio frequency (RF) transducers or antennas, processing circuitry and software, or other communication devices. Communication interface 306 may be configured to communicate over metallic, wireless, or optical links. Communication interface 306 may be configured to use Time Division Multiplex (TDM), Internet Protocol (IP), Ethernet, optical networking, wireless protocols, communication signaling, other communication formats, or any combinations thereof. In particular, communication interface 306 may be configured to communicate over a network with SASP 102, client systems 108, third party vendors 104, cloud service providers 106, or other computing nodes.

User interface 308 may comprise components that interact with a user to receive user inputs and to present media, notifications, or other information. User interface 308 may include a display screen, touch screen, touch pad, keyboard, buttons, speaker, microphone, pointer device or interface, communication port, other user input/output apparatus, or any combination thereof. Further, user interface 308 may include or interact with software or modules for presenting a graphical user interface (GUI), audio interface, or other software-based interface.

Processing system 304 may be linked to communication interface 306 and user interface 308. Processing system 304 can include processing circuitry 310 and memory device 312. Memory device 312 can store executable instructions or other operating software 316, a catalog of system components or software bill of materials (SBOM) 314, and one or more listings or databases 315 of known security vulnerabilities, legal or regulatory requirements, or other compliance or security-based data.

Processing circuitry 310 may comprise a microprocessor and other circuitry that can retrieve and execute instructions 316 from memory device 312. Memory 312 may comprise a non-volatile data storage medium, such as a disk drive or solid state drive, or volatile memory such as random access memories (RAM) and dynamic RAM (DRAM), or any other memory apparatus. Processing circuitry 310 may be mounted on a circuit board that may also hold memory device 312 and portions of communication interface 306 and user interface 308.

Executable instructions 316 may comprise computer programs, software, firmware, or other form of machine-executable processing instructions. Executable instructions 316 may include proxy module 318, and analysis module 320, although related operations may be handled by multiple different modules or programs, all operations may be performed by a single module, or additional modules may be included in executable instructions 316. Executable instructions 316 may further include an operating system, utilities, drivers, network interfaces, applications, or other types of software. When executed by processing circuitry 310, executable instructions 316 may direct processing system 304 to operate computing system 302 as described herein.

Proxy module 318 may be a set of instructions for establishing and using an SASP system as a proxy for outbound service request traffic to third party vendors. The proxy module 318 may include computer code for changing the target of service request calls to the SASP. The proxy module 318 may provide options for proxying only certain service request calls (e.g., based on target, frequency, etc), and may allow for proxying different calls through different SASP proxy systems. The proxy module 318 may intercept proxied service request calls and hash them, then set a new target. The SASP system may identify the original target from the hashed service request. While operating as a proxy, the proxy module 318 may allow for monitoring proxied service requests for unusual or unexpected data within the request, unusual frequency or patterns (e.g., a spike in a number of calls to a target), or otherwise monitor data traffic. The proxy module 318 may include instructions to freeze or quarantine certain data traffic, generate notifications to a client regarding data traffic (e.g., provided via communication interface 306 or user interface 308), wait for 2FA or other approval from a client before forwarding traffic to its original target, or perform other data traffic monitoring operations.

Analysis module 320 may include a set of instructions regarding evaluating a business' software environment and third party vendors for security, legal or regulatory compliance, or other considerations. For example, the system 302 may maintain a database of security vulnerabilities, regulatory compliance requirements, or similar data 315, or such data may be accessed over a network via communication interface 306. The analysis module 320 may compare the data of the SBOM 314 against the known vulnerabilities, privacy concerns, or compliance requirements of database 315 to determine if any of the client systems conflicts with the database information. Based on the comparison, the analysis module 320 may determine which elements present a security or compliance risk. For example, the known vulnerabilities database 315 may identify that Example Software v1.3 includes a security vulnerability, and that SBOM 314 identifies that two client computing systems are running Example Software v1.3. The analysis module 320 may generate one or more suggestions or advice based on the security analysis, e.g., via user interface 308. Suggestions may be based on recommendations included with the known vulnerabilities in the known vulnerability database 315, based on factors included in the SBOM 314, or based on other factors. For example, the known vulnerability database 315 may suggest that the security vulnerability in Example Software v1.3 is a high-risk vulnerability, and that Example Software should be updated to v1.4. However, SBOM 314 may include metadata for Example Software v1.3 indicating that it is used by the business for low-priority tasks, and is not exposed to external access. Accordingly, the Analysis module may generate a priority list that ranks updating Example Software v1.3 lower than a recommendation to fix another software vulnerability with a lower security risk, but that is external-facing and integral to the business' customer service operations.

For example, if a code library version employed in the client's system is listed as having a known security exploit, the analysis module 320 may identify the vulnerability while scanning or maintaining the SBOM 314. Similarly, if a type of data is being sent from the client system to an external party that violates a consumer privacy law, the analysis module 320 may identify this issue. The analysis module 320 may generate notifications or logs of compliance or security issues that have been identified. This analysis module 320 may produce a warning indication, e.g., via user interface 308, or may store a log file that can be accessed by a system administrator or other user.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   executing a security analysis operation for a client computing system, including:
      evaluating a data field of a service request from the client computing system to a third party to determine an expected data type for the data field, including:
         analyzing executable code corresponding to the service request to identify a parameter name corresponding to the data field; and
         determining the expected data type based on the parameter name;
      determining whether actual data included in the service request corresponds to the expected data type; and
      quarantining the service request when the actual data does not correspond to the expected data type.

2. The method of claim 1 further comprising:
   analyzing the executable code corresponding to the service request at the client computing system.

3. The method of claim 2 comprising the security analysis operation further including:
   identifying a set of potential security vulnerabilities;
   comparing the set of potential security vulnerabilities to a catalog identifying a code library detected on the client computing system; and
   generating risk mitigation advice based on potential security vulnerabilities matching an element in the catalog.

4. The method of claim 3 further comprising:
   the set of potential security vulnerabilities includes a code library version having a security flaw;
   the catalog identifies a version number of the code library; and
   generating the risk mitigation advice to recommend upgrading the code library based on comparing the version number in the catalog to the code library version from the set of potential security vulnerabilities.

5. The method of claim 4 comprising the security analysis operation further including:
   accessing a common vulnerabilities and exposures (CVE) database;
   determining the set of potential security vulnerabilities based on the CVE database; and
   generating the risk mitigation advice based on recommendations from the CVE database.

6. The method of claim 5 comprising the security analysis operation further including:
   generating the risk mitigation advice to include a corrective priority list, identifying an order which elements of the client computing system should be corrected.

7. The method of claim 6 further comprising:

the catalog includes metadata identifying which components of the client computing system are external-facing and which components are internal-facing; and
generating the corrective priority list to prioritize correction of external-facing components before internal-facing components.

8. The method of claim 7 comprising the security analysis operation further including:
operating as a proxy for the service request between the client computing system and the third party, including:
receiving the service request from the client computing system;
evaluating the service request for irregularities; and
forwarding the service request to the third party once the irregularities have been addressed.

9. A system comprising:
a processor configured to execute a security analysis operation for a client computing system, including:
evaluate a data field of a service request from the client computing system to determine whether actual data included in the service request corresponds to an expected data type for the data field, including:
analyze executable code corresponding to the service request at the client computing system to identify a parameter name corresponding to the data field;
determine the expected data type based on the parameter name;
identify a set of potential security vulnerabilities;
compare the set of potential security vulnerabilities to a catalog identifying elements on the client computing system; and
generate risk mitigation advice based on potential security vulnerabilities matching an element in the catalog.

10. The system of claim 9 further comprising:
the set of potential security vulnerabilities includes a code library version having a security flaw;
the catalog identifies a version number of a code library; and
the processor further configured to generate the risk mitigation advice to recommend upgrading the code library based on comparing the version number in the catalog to the code library version from the set of potential security vulnerabilities.

11. The system of claim 9 further comprising:
the catalog includes metadata identifying how components are deployed within the client computing system; and
the processor further configured to generate the risk mitigation advice to include a corrective priority list, identifying an order which the components should be corrected based on the metadata.

12. The system of claim 9 comprising the processor further configured to:
operate as a proxy for the service request between the client computing system and a third party, including:
receive the service request from the client computing system;
evaluate the service request for irregularities; and
forward the service request to the third party once the irregularities have been addressed.

13. The system of claim 9 comprising the processor further configured to:
evaluate the data field of the service request from the client computing system to a third party to determine an expected data type for the data field;
compare the actual data included in the service request to the expected data type; and
quarantine the service request when the actual data does not correspond to the expected data type.

14. The system of claim 13 comprising the processor further configured to:
analyze the executable code corresponding to the service request at the client computing system.

15. A memory device storing instructions that, when executed, cause a processor to perform a method comprising:
executing a security analysis operation for a client computing system, including:
operating as a proxy for a service request between the client computing system and a third party, including:
receiving the service request from the client computing system;
evaluating the service request for irregularities;
evaluating a data field of the service request to determine whether actual data included in the service request corresponds to an expected data type for the data field, including:
analyzing executable code corresponding to the service request to identify a parameter name corresponding to the data field;
determining the expected data type based on the parameter name; and
forwarding the service request to the third party once the irregularities have been addressed.

16. The memory device of claim 15 storing instructions that, when executed, cause the processor to perform the method further comprising:
comparing the actual data included in the service request to the expected data type; and
quarantining the service request when the actual data does not correspond to the expected data type.

17. The memory device of claim 15 storing instructions that, when executed, cause the processor to perform the method further comprising:
identifying a set of potential security vulnerabilities;
comparing the set of potential security vulnerabilities to a catalog identifying a code library detected on the client computing system; and
generating risk mitigation advice based on potential security vulnerabilities matching an element in the catalog.

18. The memory device of claim 17 storing instructions that, when executed, cause the processor to perform the method further comprising:
the set of potential security vulnerabilities includes a code library version having a security flaw;
the catalog identifies a version number of the code library; and
generating the risk mitigation advice to recommend upgrading the code library based on comparing the version number in the catalog to the code library version from the set of potential security vulnerabilities.

19. The memory device of claim 15 storing instructions that, when executed, cause the processor to perform the method further comprising:
identifying elements within the client computing system requiring corrective security action based on a catalog of components of the client computing system; and
generating risk mitigation advice to include a corrective priority list, identifying an order which the elements should be corrected.

20. The memory device of claim 19 storing instructions that, when executed, cause the processor to perform the method further comprising:
- the catalog includes metadata identifying which components of the client computing system are external-facing and which components are internal-facing; and
- generating the corrective priority list to prioritize correction of external-facing components before internal-facing components.

* * * * *